Patented Feb. 8, 1949

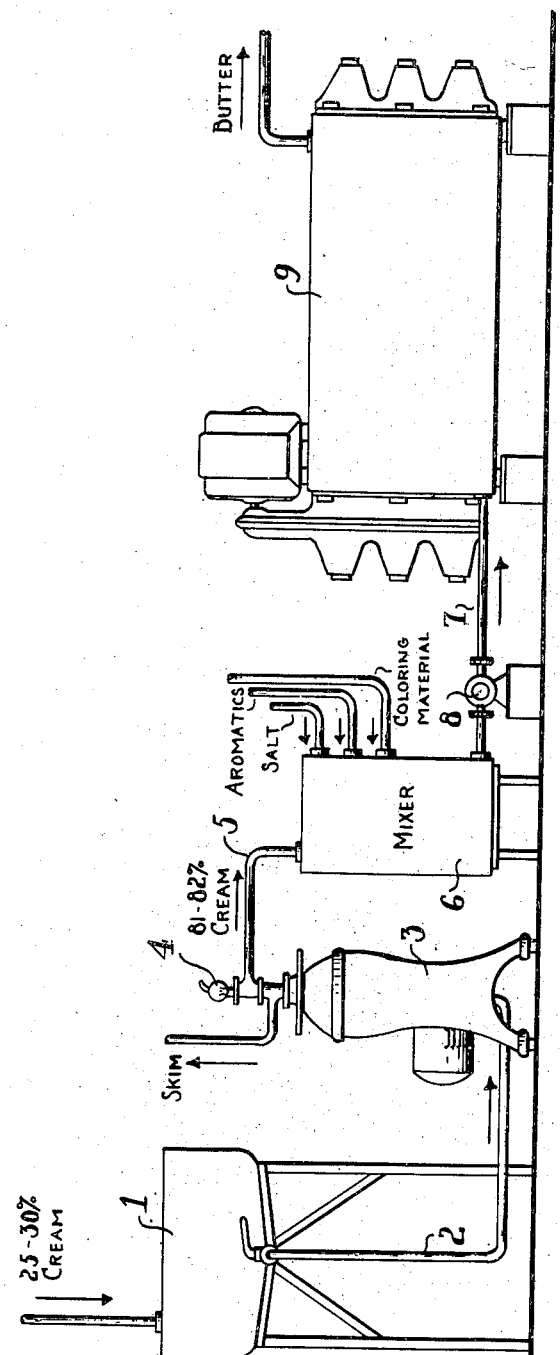

2,461,117

UNITED STATES PATENT OFFICE 2,461,117

METHOD OF PRODUCING BUTTER BY COOLING CREAM OF HIGH CONCENTRATION

Hans Olof Lindgren, Appelviken, Sweden, assignor to Aktiebolaget Separator, Stockholm, Sweden, a corporation of Sweden Application October 10, 1942, Serial No. 461,628
In Sweden March 7, 1942

3 Claims. (Cl. 99—119)

Highly concentrated cream differs from butter having the same percentage of cream. In cream the fat exists as a suspension in serum, that is, in a dispersed phase. Butter is a product consisting of serum in fat, that is, the fat is in a continuous phase. That this phase conversion occurs in the churning of cream into butter is known in the art. It has been endeavored to produce butter by cooling high concentration cream to a low temperature. The solid mass thus obtained was not always butter, as above defined. Failure of this cooling method to reliably produce butter was due either to failure to fully understand the necessity of this phase conversion, or to lack of knowledge of the procedures required to produce a concentrated cream which, on cooling, would with certainty effect this reversal of phase.

The figure of the drawing diagrammatically illustrates one form of appartus that has been efficient in carrying out the process hereinafter described.

My invention involves the production of butter by the cooling of concentrated cream and comprises a method of obtaining the cream which ensures reversal of phase in the cooling operation. It has been found that in cream the fat globules are enclosed by so-called membranes, which consist of albuminous substances, rich in lecithin, that prevent the fat globules from flowing together to form butter. In the usual churning process, the membranes are broken by the agitation and removed with the froth formed in the churns. In the process involving my invention the membranes are removed from a sufficient number of fat globules in the separating operation to permit the desired conversion to take place on cooling. To effect this result the amount of fat fed into the separator per unit of time is determined and regulated according to the centrifugal force of the zone in which the liquid is fed into the separating chamber, according to the separating time and the separating temperature, and according to the field of centrifugal force of the inlet zone of the bowl. It has been found unnecessary to liberate and remove the membranes completely. It is necessary only that centrifuged cream concentrate should be in such condition that sufficient amounts of fluid fat are pressed out on cooling and form a fluid phase which encloses the fat globules.

It is possible to find out if the membranes are removed to a sufficient degree by comparing the result of a fat analysis according to Röse-Gottlieb and that obtained by microscoping. For a detailed description of the Röse-Gottlieb method of analysis, reference is made to the publication by the American Public Health Association, 1914, New York, N. Y., entitled "Standard Methods of Milk Analysis, Bacteriological and Chemical." In the separating operation the various factors influencing the result should be so regulated that only a small number of minute fat globules are visible in the microscope. Under normal working conditions these correspond to a fat content of about 0.02% in the skim milk. However, a fat analysis according to the method stated shows a fat content of 0.15–0.20%. These figures apply when the concentration is carried out in two separating stages and when the cream in the second stage is concentrated from a fat content of 35% to a fat content of 85%. In the microscopic determination of the fat content, only those fat globules whose diameter is larger than $0.5\mu$ have been taken into account. Fat globules contained in the skim milk and having a diameter smaller than the one stated contain such minute amounts of fat that, if they were taken into consideration, they would not materially change the first-mentioned figure.

The difference between the fat content found by analysis and that found by microscopic determination is due to phospho-lipids-lecithins—soluble in the extraction agents (alcohol, sulphuric ether and petroleum ether) and originating from the membranes. In order to be sure that phase conversion takes place, at least 0.25 gr. substances above the amount of fat obtained in microscopic investigation when taking into account fat globules whose diameter is larger than $0.5\mu$ must be dissolved in extraction according to Röse-Gottlieb out of the amount of skim milk corresponding to 100 gr. fat obtained in the high-concentration cream. If the conditions of work are changed so that the microscopic examination shows a higher fat content (a greater number of and also larger fat globules than in the previous case) the analysis will also show a corresponding higher fat content. The values stated above should however only be regarded as normal or typical values. Milk from different cows and different breeds has quite different properties, which also influence the thickness and the nature of the membranes.

At high separating temperatures and a low throughput (throughout denoting the amount of fat separated per time unit) it is possible to obtain a satisfactory result with standard cream separators. It has been found that a still better result can be reached, or a higher capacity attained, if the liquid is fed into the bowl at a greater distance from the rotation axis. It has thereby been found efficient to supply the liquid in or outside the middle zone of the separating chamber. The capacity at which a given bowl yields a satisfactory result is determined not only by the distance of the inlet zone from the rotation axis of the bowl but also by the rotation speed of the bowl and the separating temperature. The higher these latter factors are, the higher the capacity.

A highly concentrated cream, >70%, may be produced in one or more separating stages. If only one separating stage is used, the inlet zone in the separating chamber should be so located that the membranes are removed in a sufficient degree and that the separator bowl effects a satisfactory clean skimming, that is, yields a skim milk of low fat content.

When separating in two or more separating stages, it is advantageous, in the first stage, to use that normal type of bowl in which the skim milk is supplied comparatively close to the rotation axis of the bowl. The cream leaving this bowl is fed into a second bowl in which the inlet zone of the separating chamber is located at a greater distance from the rotation axis than in a bowl designed for concentrating in one stage. Such location of the inlet zone of the second bowl is found advantageous because the amount of skim milk in the cream fed thereto is small and the amount of fat large. It is not, however, necessary to obtain extremely clean skimming, since the skim milk from the second separating stage may be returned to the first separating stage, in which most of the fat globules contained therein are recovered and the separated cream then transferred to the second separating stage. The clean-skimming in the second separating stage must not, however, be too poor, since an unnecessarily large amount of fat, consisting mainly of small fat globules, would then be returned to the first separating stage. In such case the throughput of the first stage would be necessarily reduced in order to maintain clean skimming. The liquid poor in fat coming from the second stage may either be mixed with whole milk flowing to the first stage or be separated in a centrifuge adapted for separating a liquid poor in fat.

It has been found that a separating temperature of over 60° C. is particularly advantageous. In two-stage separation a lower temperature may be used in the first stage.

When producing butter on a large scale it is important that the water content of the butter should be only slightly below the highest content prescribed by law. A substantially lower water content means an economic loss, as the price of butter is generally independent of the water content.

In the separating process it is usually not possible to regulate the fat content of the cream with sufficient accuracy. Even if this could be done when the separation is started, it is not certain that the average fat content of the whole quantity of cream obtained will be the one desired. The fat content of the cream is influenced by a plurality of factors, namely: the velocity of the separator, the fat content of the liquid being supplied, the separating temperature and the pressure at the outlets of the separator. For this reason it is advisable to collect the cream in one or more containers that are rotatable or are provided with stirrers. After careful mixing of such cream, a sample is drawn and the water content of the cream is determined by any one of several known methods. Proceeding from the known amount of cream in the container, the quantity of liquid which should be added or removed, in order that the butter shall have the desired water content, is now calculated.

It is desirable, for several reasons, to so regulate the separation as to produce a cream of higher water content than the one which the butter should have. Continuous separation free from disturbance is obtained with more certainty if the separation is regulated to produce, for example, a 78–80% cream than if regulated to produce, for example, an 85–86% cream. A cream having a fat content much in excess of 80% is quite viscous even at high temperature, and, due to excessive viscosity, it may flow irregularly in the thin layers formed between the discs in the separating chamber of the bowl. Stagnant portions which are not properly separated may even be formed and cause irregularities in the fat content of the cream. Even if a higher water content shall be aimed at, it may nevertheless occur that the water content of the cream is found to be lower than the highest allowable content. In such a case the water content is increased by mixing water, skim milk or whole milk or possibly cream of higher water content with the cream obtained. If the water content of the cream is higher than the one allowed, a calculated amount of water is evaporated, preferably while stirring.

As hereinbefore stated, a high separating temperature is advantageous. A high temperature of course also facilitates the evaporating of water, and for this reason it is desirable to work with a separating temperature of 85° C. or above in the second stage. In case only a small amount of water need be removed, this may be effected without heating and at atmospheric pressure. For the reasons hereinafter stated the containers should, however, be arranged for evaporating at higher temperatures and under vacuum. For producing a butter which will not undergo any changes on being stored for months at a temperature of some degrees above freezing, the cream should be well sterilized by heating to 85° C. or more. If a sterilizing temperature higher than 90° C. is used in normal churning, the butter has a so-called boiled taste. Evaporation of water, as herein disclosed, reduces or removes any boiled taste that may exist in the cream when it left the separator. In evaporating, volatile matters that would give to the butter an objectionable taste or odor are carried off with the water vapor. This favourable effect is especially valuable if the whole milk contains any such volatile substances. Such milk is produced when the cows feed on turnips or other fodder having a strong taste or scent. In order to get a butter without such taste, some water, not in too inconsiderable amount, should be evaporated. It has been found, for example, that the boiled taste disappears and that the turnip taste is substantially reduced if the water content of the cream, expressed in per cent., is reduced by at least one unit in the evaporating process; but if the taste of turnip is very strong, a still larger amount of water will have to be evaporated. The amount of water to be evaporated of course also depends on temperature and vacuum.

It has been found that when heating a cream of high fat content to the above specified separating temperature of 85° C., a strong boiled taste results. The taste is mitigated if the fat content of the cream fed to the second separating stage is not less than 15 to 25%.

One way to conveniently ascertain when the desired amount of water has been evaporated is to condense the water vapor in a closed system and collect the condensate in a container that is either mounted on scales or provided with a gauge glass or other means by which the quantity of water may be determined.

The cream fed into the container should preferably be free from air bubbles, because the oxygen contained therein may cause harmful reactions with the fat during the period of storing. For this reason it is advantageous to use so-called "closed" separators, the outlets of which are coupled to fixed pipe lines by packings. So-called paring-disc separators may also be used, from which the liquids are discharged by stationary paring devices projecting into the rotating layers of liquid. With such separators it is possible to regulate the fat content of the cream to the desired value by providing throttles in the outlets. In order to prevent any changes that may occur in the resistance to the flow in pipe lines and apparatus from exercising an influence at the outlets of the separator, it is preferable to use throttles that will automatically maintain constant pressures at the outlets from the separator regardless of variations of resistance in the outlet pipes. Any such throttle should be adjusted to maintain a pressure that is higher than the highest pressure which may occur in the pipe beyond the throttle. Separators and regulators of the character described are known in the art. See Forsberg U.S. Patent No. 2,043,350, June 9, 1936, and Hall Patent No. 1,189,687, July 4, 1916.

In order to prevent harmful changes (for example, oxidation of vitamins) occurring during a long storing time at high temperature, it may be advantageous to cool the cream before or immediately after it has entered the storage tank. The storage temperature may be substantially lower than the separating temperature, the former having to be determined according to the storing time. If this is very long, a low storage temperature should be selected. It may then be necessary to heat the cream prior to evaporation of water.

If the cream is cooled in the storage tank, the cream current should be directed along the wall of the tank, which should be kept at a low temperature by refrigerating liquid having, preferably, about the same temperature as the storage temperature.

In many cases it is preferable to cool the cream in an apparatus coupled ahead of the storage tank. For this purpose known apparatus of so-called plate or tube type, through which the cream flows in thin layers, may be used to advantage.

The automatic pressure valves hereinbefore referred to may advantageously be used in connection with such coolers. It may be desirable in some cases to connect the cooler to a pasteurizer of the same type. This is especially desirable if the separating temperature is substantially lower than 80° C. or if the cream was not pasteurized prior to concentration.

With a considerable resistance to the flow in the cooler or the pasteurizer, a pump should be provided beyond the separator in order too high counter-pressure at the cream outlet of the separator. Cooling from the separating temperature may also be necessary when a cream of a water content lower than that of the butter is taken out.

During storage, aromatic matters, salt, etc. may be mixed with the cream. It should also be noted that the matters which give desirable aroma to the butter are volatile and therefore are partly removed in the evaporating step. Desirable aromatic matters may be therefore advantageously added after standardizing the cream, preferably after the temperature of the cream has been lowered below the evaporating temperature by pre-cooling.

In some cases it is desirable to colour the butter. Like salt and aromatic matters, the coloring agent may be added in the storage container before, during or after standardizing. It is also possible to add the coloring matter in the cream between the first and the second separating stage or in the separator in the second stage.

If the cream is cooled in the storage container below the converting temperature until all cream has been converted into butter, the same difficulties are experienced as when churning in metal churns; that is, the butter adheres to the metal surfaces. Butter so adhering can seldom be completely removed unless special measures are taken. According to the present method of producing butter, this objectionable condition is avoided by interrupting the cooling in the storage container before the cream has been completely converted into butter. The cream is then transferred to smaller containers, in which it is completely converted into butter under continued cooling. The said containers may consist of butter barrels which are put into a refrigerating room for cooling. In these the cooling takes place very slowly—in two to three days and nights. It is therefore better to transfer the cream to rectangular cases of small height, in which the cooling takes place with substantially more rapidity.

The cooling in the storage container occurs while stirring. The cooling to the converting temperature is thereby accelerated because the mass remains fluid down to the moment of butter formation. Without stirring or other equivalent agitation, the product will solidify to a tallow-like mass at a temperature of 30° C. By stirring it becomes possible to press out a fluid mass under a slight over-pressure through a discharge pipe into a smaller container.

The transmission of heat is improved if the shape of the stirrer is closely similar to that of the wall of the container. It should preferably be provided with elastic scrapers by which any mass that deposits on the refrigerating surface can be scraped off.

In order to reduce the risk of depositions of butter it is advantageous to use a refrigerating liquid having a temperature of 20–25° C. for the pre-cooling. The refrigerating surface is then unable to cool the butter to a point at which butter formation takes place. When the cream has been cooled to about 25° C., the temperature of the refrigerating liquor is advantageously lowered successively to the discharge temperature, which should be determined according to the composition of the fat. As is well known, the composition is not constant, nor has butter fat a fixed solidifying point. The pre-cooling should be interrupted and the mass should be transferred to the final cooling before any considerable part of the cream has been been converted into butter. If this is omitted, and the cream is cooled in the pre-cooler, while stirring, for a longer time, an uneven product is obtained, consisting of butter granules distributed through a liquid of higher water content. The cooling in the small containers takes place without stirring. The unhomogenous mass transferred to the smaller coolers remains unhomogeneous after complete butter formation, having portions poor in water enclosed in portions rich in water. The water content of the latter portions may be so high that water or milk is pressed out during storage or when the mass is cut into small pieces. In these portions the water is very finely distributed in the cream and may be drawn together to larger drops, so that the keeping qualities of the butter are reduced. If such a butter has been produced, a homogeneous composition may be given to it by a suitable working.

If the pre-cooling has inadvertently been pushed so far that some cream has been converted into butter and if this is noticed before the cream-butter mass is drawn off, the following process may advantageously be used. The mass is cooled in the pre-cooler while stirring until all cream has been converted into butter. As the conversion takes place while stirring, water is again mixed with the portions of butter which were first produced; that is, the homogeneity of the mass is restored. It is, however, no longer sufficiently fluid to enable the butter to be drawn off in fluid form. By a slight warming to 20–23° C. the butter acquires such a consistency that this becomes possible, and at the same time the amount of butter fat sticking to the wall of the vessel is reduced.

In the foregoing description I mention a series of processes which may take place in the storage container. For greater clearness of disclosure these processes may be restated as follows: Collecting the cream during separation, possibly after cooling to storage temperature; mixing before drawing a sample for determination of water content; adding salt, coloring, and aromatic matters; adding water, or evaporating water after heating and cooling while agitating. For agitating, either a revolving container, or a stationary, double-walled container provided with a stirrer, may be used. Whatever construction may be used, the container should be susceptible of being closed in order to allow the use of superatmospheric pressure when the cream is being drawn off, or of a vacuum when the water is being evaporated.

In the foregoing description it is pointed out that the cooling in normal butter barrels proceeds slowly and that a long time is therefore required for the inner part of the fat to be converted into butter. Before this has taken place the product cannot be regarded as ready for delivery, because cream with water in continuous phase has a substantially lower keeping quality than that of butter. As butter formation requires two to three days when ordinary butter barrels are used, cooling and storing rooms for the butter may be necessary. Where requisite storing rooms for slow cooling are not available, the process of butter formation may be accelerated by cooling the cream, while still a fluid, to a temperature which is substantially lower than the butter-converting temperature. For this purpose a continuous rapid cooler may be coupled to the storage container, from which cooler the cream is conveyed to the butter barrels. By quick cooling while stirring moderately it is possible to cool to a temperature far below the butter-converting temperature, without the risk of lack of homogeneity hereinbefore referred to. The work of the rapid cooler will be reduced if the cream is transferred to it at a temperature which is only slightly higher than the butter converting temperature.

If no special measures have been taken, the milk serum mixed with the cream will have the same composition as the skim milk. The butter thereby produced thus has a higher content of albumin and milk sugar than that of ordinary butter. This fact does not impair the quality of the butter if the liquid is uniformly suspended in the cream in the form of fine drops. If a butter of lower albuminous content is desired, this can be produced in a two stage separation by diluting the cream from the first stage with water. By adding the water at a high temperature, e. g., nearly 100° C., the diluted mixture of cream will be heated to a temperature of 85° C., thereby eliminating the necessity of any special pasteurization. When the cream does not need to be washed with water, the pasteurizing step may be omitted if sufficient amounts of warm skim milk are mixed with the cream from the first stage. If a low temperature is used in the first separating stage, and if the temperature desired in the second separating stage is not reached by adding hot water, it may be added after the cream has been heated to a suitable temperature.

Cream containing from 25 to 30% butterfat, after pasteurization, is passed to a balancing vat 1, from which it is fed, through a closed pipe 2, to a centrifugal separator 3 of the closed type, in which the cream is concentrated to about the fat content required for the finished butter (usually 81—82%). This cream is fed through a closed pipe 5. By means of a so-called "cream valve" 4 (the detailed construction of which is known in the art) the cream outflowing from the separator may be maintained under substantially constant pressure. When the cream has been standardized to within 1% fat content and the temperature and rate of feed maintained constant, the cream valve may be set, requiring no adjustment. The cream flows through closed pipe 5 to a mixer 6 in which salt, coloring material and aromatics may continuously be added and thence, through a closed pipe 7 (in which a pump 8 is interposed) to a "transmutator" 9 (provided with rotating cylinders) in which the cream is cooled down to the temperature required to reverse the phase and thereby convert the cream into butter. The butter leaves the cooler at a temperature of about 11—13° C. in a translucent and fluid state but sets in the collecting vessel (not shown) within about 15 minutes.

What I claim and desire to protect by Letters Patent is:

1. The herein described method of producing butter which comprises subjecting a milk fluid containing a relatively small percentage of butterfat to the action of centrifugal force to thereby separate the same into skim milk and a concentrated cream containing a percentage of butterfat approximating that which it is desired to obtain in the subsequently produced butter, conveying the separated concentrated cream, while maintaining it in the phase of a suspension of fat in serum, to a locus of cooling, maintaining said milk fluid during the separating process and the separated concentrated cream while conveying it to the locus of cooling out of substantial contact with atmospheric air, and by cooling in said locus effecting reversal of phase and conversion of the cream into butter.

2. The herein described method of producing butter which comprises subjecting a milk fluid containing a relatively small percentage of butterfat to the action of centrifugal force to thereby separate the same into skim milk and a concentrated cream containing a percentage of butterfat approximating that which it is desired to obtain in the subsequently produced butter, conveying the separated concentrated cream, while maintaining it in the phase of a suspension of fat in serum, to a locus of cooling, maintaining said milk fluid during the separating process and the separated concentrated cream while conveying it to the locus of cooling out of substantial contact with atmospheric air, maintaining the concentrated cream outflowing from the locus of separation under a substantially constant pressure to thereby insure the production of a cream having a substantially uniform butterfat content, and by cooling in said locus effecting reversal of phase and conversion of the cream into butter.

3. A method of producing butter which comprises feeding to a locus of centrifugal force a milk fluid containing a relatively small percentage of butterfat to subject the fluid to the action of centrifugal force and thereby separate same into skim milk and concentrated cream containing a percentage of butterfat approximating that desired in the subsequently produced butter, separately discharging the concentrated cream from the locus against a pressure, maintaining said pressure substantially constant for a given rate, butterfat content and temperature of the feed to said locus, to thereby ensure the production of concentrated cream having a substantially uniform butterfat content, feeding said concentrated discharge from the locus to a cooling zone while maintaining said discharge in the phase of a suspension of fat in serum, maintaining said concentrated discharge in its passage from said locus to said zone out of substantial contact with air and at a lower pressure than said discharge pressure, and, within said zone, reversing the phase of said concentrated discharge to convert the cream into butter by cooling the cream.

HANS OLOF LINDGREN.

REFERENCES CITED

The following references are of record in the file of this patent:

UNITED STATES PATENTS

| Number | Name | Date |
|---|---|---|
| 450,391 | Wahlin | Apr. 14, 1891 |
| 1,219,291 | Gray | Mar. 13, 1917 |
| 1,736,792 | Lundgren | Nov. 26, 1929 |
| Re. 19,123 | Wendt | Mar. 27, 1934 |
| 2,150,943 | Sharples | Mar. 21, 1939 |
| 2,150,944 | Sharples | Mar. 21, 1939 |
| 2,168,376 | Van der Meulen | Aug. 8, 1939 |
| 2,264,665 | Hall | Dec. 2, 1941 |
| 2,299,440 | Van der Meulen | Oct. 20, 1942 |